(12) United States Patent
Dunnewind et al.

(10) Patent No.: US 11,406,125 B2
(45) Date of Patent: Aug. 9, 2022

(54) INSTALLATIONS AND METHODS FOR MOULDING FOOD PRODUCTS WITH A PRESSURIZED AIR FOOD PRODUCT EJECTION SYSTEM FROM A MOULD DRUM

(71) Applicant: MAREL FURTHER PROCESSING B.V., Boxmeer (NL)

(72) Inventors: Albertus Dunnewind, Wageningen (NL); Johannes Martinus Meulendijks, Deurne (NL); Thomas Willem Dekker, Nijmegen (NL); Tihomir Tubic, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 330 days.

(21) Appl. No.: 16/466,976

(22) PCT Filed: Dec. 21, 2017

(86) PCT No.: PCT/NL2017/050860
§ 371 (c)(1),
(2) Date: Jun. 5, 2019

(87) PCT Pub. No.: WO2018/117831
PCT Pub. Date: Jun. 28, 2018

(65) Prior Publication Data
US 2019/0343165 A1  Nov. 14, 2019

(30) Foreign Application Priority Data

Dec. 21, 2016  (NL) .................................... 2018036

(51) Int. Cl.
*A22C 7/00* (2006.01)
*A23P 30/10* (2016.01)
(Continued)

(52) U.S. Cl.
CPC ............ *A23P 30/10* (2016.08); *A22C 7/0038* (2013.01); *A22C 7/0069* (2013.01);
(Continued)

(58) Field of Classification Search
CPC ................... A22C 7/0038; A23P 30/10; B29C 2043/5053; B29C 45/43; B29C 2049/702
See application file for complete search history.

(56) References Cited

U.S. PATENT DOCUMENTS 7,976,303 B2 * 7/2011 van der Eerden ... A22C 7/0092
425/241
9,433,238 B2   9/2016 Van Der Eerden et al.
(Continued)

FOREIGN PATENT DOCUMENTS

EP   2 901 862 A1   8/2015
JP   H0272919    *   3/1990
(Continued)

OTHER PUBLICATIONS

JPH0272919 machine translation (Year: 1990).*
(Continued)

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

A moulding installation and method for moulding food products from a pumpable foodstuff mass are described. A revolving mould drum is provided with multiple mould cavities and a mass feed member is arranged at a fill position to transfer foodstuff mass into passing mould cavities. The foodstuff mass forms a food product in the mould cavity. A pressurized air food product ejection system includes air ducts in the mould drum that extend to the cavities and at least a portion of the surface delimiting a mould cavity is air (Continued)

Figure 1:
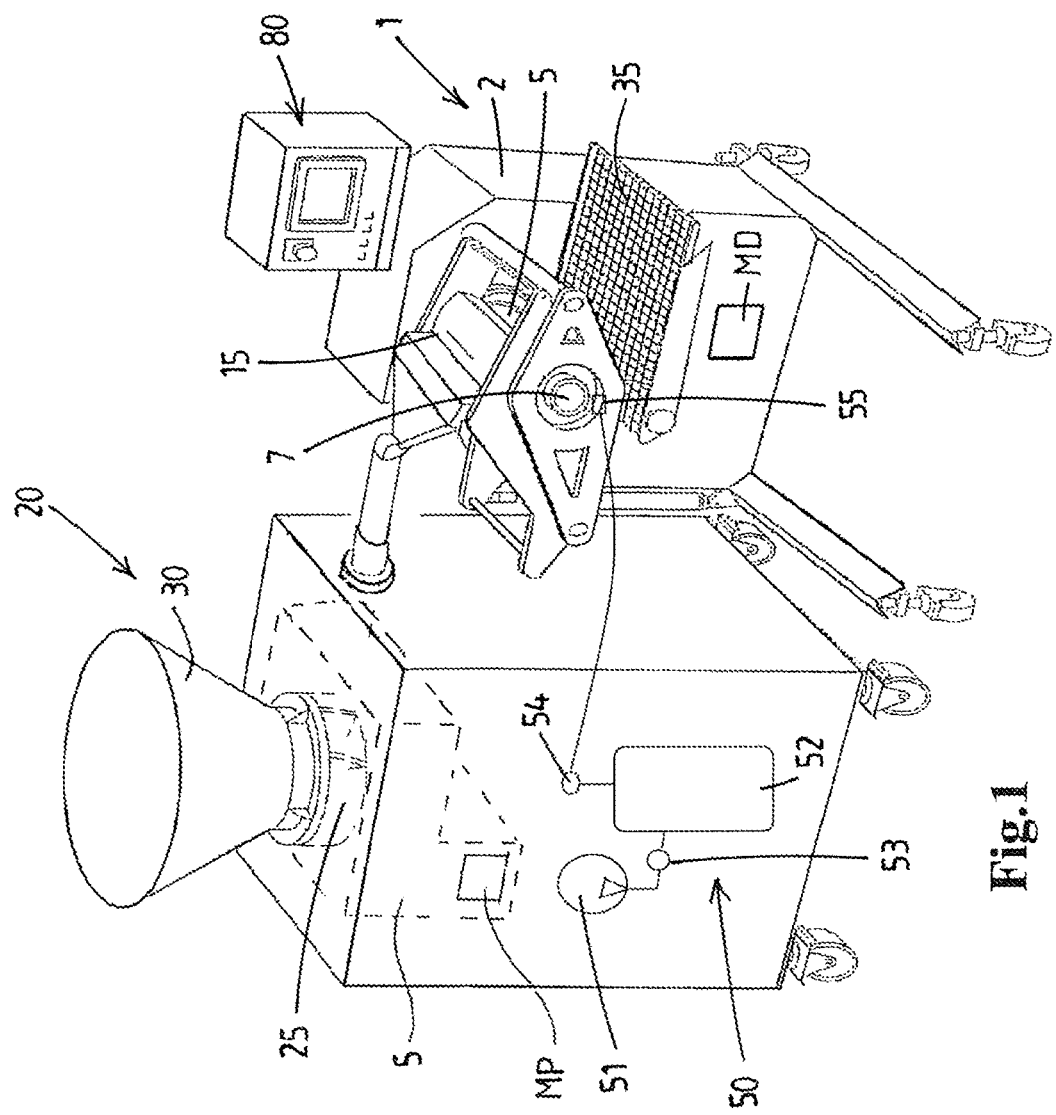

permeable. The ejection system further includes a pressurized air source to feed pressurized air at a regulated ejection air pressure thereof to the air ducts. A controller is adapted to input at least one target parameter related to filling of the mould cavities with the foodstuff mass via the mouth of the mass feed member. The controller is adapted to automatically set an ejection air pressure by the pressurized air source on the basis of the inputted target parameter.

13 Claims, 6 Drawing Sheets

(51) Int. Cl.
    *B29C 31/04*     (2006.01)
    *B29C 31/06*     (2006.01)
    *B29C 33/00*     (2006.01)
    *B29C 33/36*     (2006.01)
    *B29C 33/38*     (2006.01)
    *B29C 33/46*     (2006.01)
    *B29C 37/00*     (2006.01)
    *B29C 39/06*     (2006.01)
    *B29C 39/24*     (2006.01)
    *B29C 39/44*     (2006.01)
(52) U.S. Cl.
    CPC .......... *A22C 7/0076* (2013.01); *B29C 31/041* (2013.01); *B29C 31/047* (2013.01); *B29C 31/06* (2013.01); *B29C 33/0061* (2013.01); *B29C 33/36* (2013.01); *B29C 33/3814* (2013.01); *B29C 33/46* (2013.01); *B29C 37/0003* (2013.01); *B29C 39/06* (2013.01); *B29C 39/24* (2013.01); *B29C 39/44* (2013.01); *B29C 2037/903* (2013.01); *B29C 2037/94* (2013.01)

(56) References Cited

U.S. PATENT DOCUMENTS

| | | | |
|---|---|---|---|
| 2006/0013917 A1* | 1/2006 | Azzar | .................. A22C 7/0084 |
| | | | 425/438 |
| 2012/0058213 A1* | 3/2012 | Lindee | .................. A22C 7/0084 |
| | | | 425/135 |
| 2015/0208716 A1 | 7/2015 | Schmid | |
| 2015/0359231 A1 | 12/2015 | Van Gerwen et al. | |
| 2016/0309773 A1 | 10/2016 | Van Esbroeck et al. | |

FOREIGN PATENT DOCUMENTS

| | | |
|---|---|---|
| WO | WO 2004/002229 A2 | 1/2004 |
| WO | WO 2012/161577 A1 | 11/2012 |
| WO | WO 2014/148897 A2 | 9/2014 |
| WO | WO 2015/082284 A2 | 6/2015 |

OTHER PUBLICATIONS

International Search Report, issued in PCT/NL2017/050860, dated Jun. 14, 2018.
Written Opinion of the International Searching Authority, issued in PCT/NL2017/050860, dated Jun. 14, 2018.

* cited by examiner

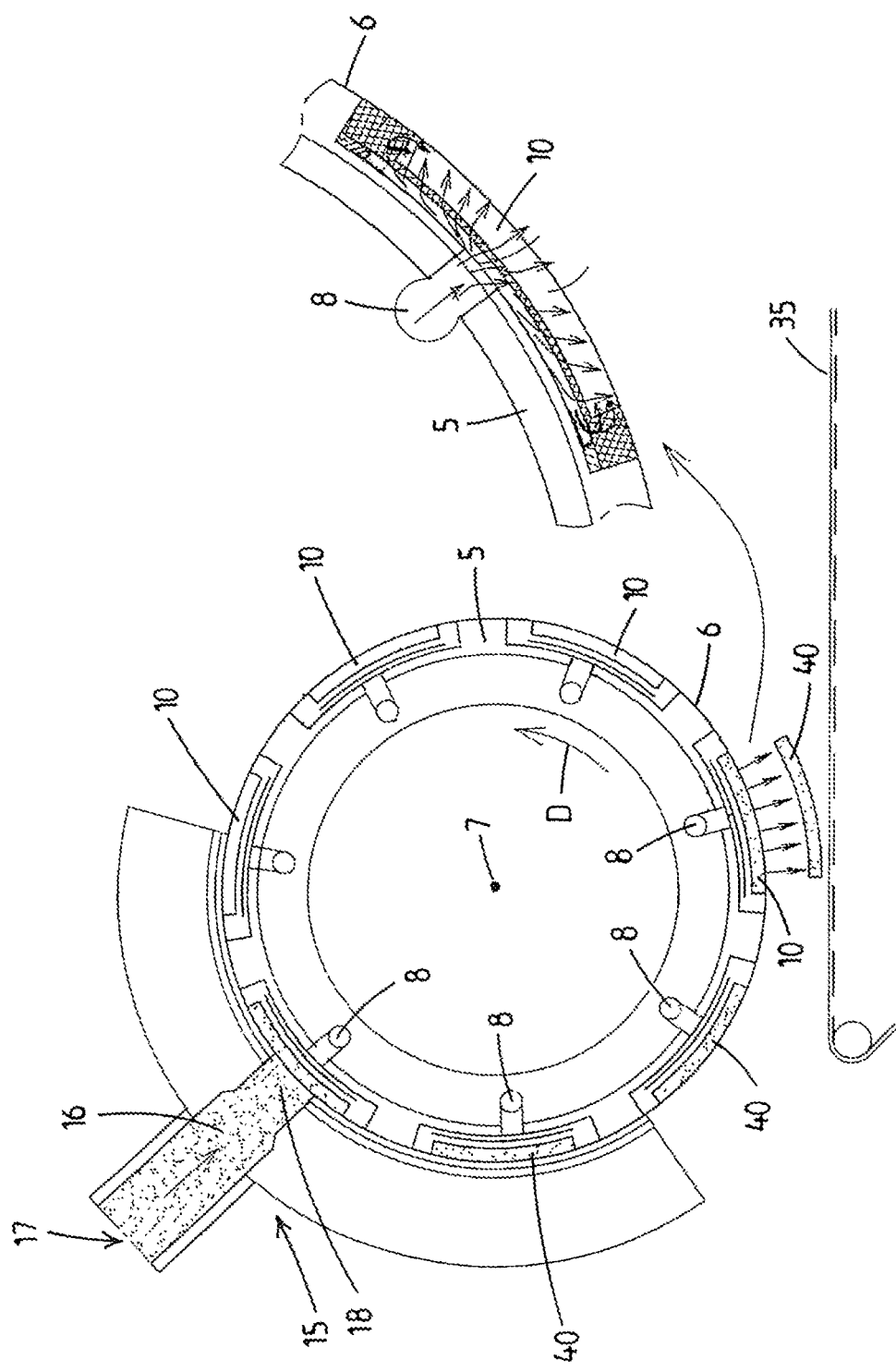

INSTALLATIONS AND METHODS FOR MOULDING FOOD PRODUCTS WITH A PRESSURIZED AIR FOOD PRODUCT EJECTION SYSTEM FROM A MOULD DRUM

The present invention relates to a moulding installation and a method for moulding food products from a pumpable foodstuff mass.

For example WO2004/002229 discloses a moulding installation for moulding food products from a pumpable foodstuff mass, which installation comprises a frame and a mould drum having an outer circumferential drum surface and a longitudinal drum rotation axis. The drum is rotatably supported by the frame to revolve about the drum rotation axis. The mould drum has in the drum surface circumferential arrays of multiple mould cavities, said array being side by side in longitudinal direction of the drum. Each mould cavity has a fill opening for the introduction of foodstuff mass into the mould cavity. Each mould cavity has a surface of which at least a portion is air permeable, e.g. as said mould cavity is formed in a porous material, e.g. a porous sintered metal, with said pores opening out at said surface. In an alternative the mould cavity material is solid or non-porous, with air holes being machined therein. The known installation has a mould drum drive that is coupled to the drum to drive the drum in a rotation direction, e.g. in a continuous manner, e.g. at a constant or fluctuating speed, over in a stepwise manner. A mass feed member is arranged at a fill position relative to the drum surface. This mass feed member has a chamber with an inlet for foodstuff mass to introduce the foodstuff mass into the chamber and with a mouth facing the drum surface. The mass feed member is adapted to transfer foodstuff mass into passing mould cavities of the revolving mould drum when the filling opening of a mould cavity is in communication with the mouth at the fill position. The foodstuff mass forms a food product in the mould cavity.

The known installation further has a foodstuff mass feed and pressurization system, comprising a pump that is connected to the inlet of the mass feed member. This system is adapted to feed foodstuff mass into the chamber of the mass feed member and via said mouth into said mould cavities.

In order to facilitate and/or cause ejection of the moulded food product from the mould cavities at a product release position, in practice above a food products conveyor, the known installation comprises a pressurized air food product ejection system. Herein the mould drum has air ducts that extend from a head or axial end of the drum to the mould cavities, e.g. to a row of cavities generally parallel to the drum rotation axis. These air ducts are each adapted to transport air to the associated row of mould cavities so that said air passes through said air permeable mould cavity surface portion of said cavities.

The air ejection system further comprises a pressurized air source that is operable to feed pressurized air at a controllable ejection air pressure thereof to one or more of the air ducts associated with one or more mould cavities in a product release position thereof. The air causes a reduction or elimination of stick between the moulded food product and the mould cavity surface and may cause an effective ejection force on the food product, e.g. in additional to gravity urging the food product out of the cavity and/or a sectional force of a conveyor mechanism that seeks to remove the food product from the cavity.

The known installation, e.g. as further disclosed in WO2012/161577, comprises a controller which is linked to said foodstuff mass feed and pressurization system and is adapted to input a target fill pressure, within a selectable target fill pressure range, for the foodstuff mass in the chamber of the mass feed member and/or in the mould cavity to be caused by said foodstuff mass feed and pressurization system.

As disclosed for example in WO2015/082284, instead of inputting a target fill pressure, or in combination with such an input, it is also known to control the operation of the mould drum installation on the basis of an inputted volumetric flow rate for the foodstuff mass into the chamber of the mass feed member and/or into the mould cavity to be caused by said foodstuff mass feed and pressurization system.

A further prior art installation is disclosed in EP2901862.

The present invention aims to provide an improved installation, e.g. an installation that is easier to operate and/or may be operated at a higher efficiency, e.g. the latter in view of production of food products and/or the use of rather costly compressed air for operation of the installation. Also the invention aims to provide enhanced quality of the moulded food products, e.g. uniformity of weight of moulded products.

The invention proposes in a first aspect thereof a moulding installation according to claim 1.

The invention proposes a moulding installation for moulding food products from a pumpable foodstuff mass, which installation which comprises a frame and a mould drum having an outer circumferential drum surface and a longitudinal drum rotation axis, the mould drum being rotatably supported by the frame to revolve about the drum rotation axis. Herein the outer circumferential drum surface comprises multiple mould cavities, each mould cavity having a fill opening for introduction of foodstuff mass into the mould cavity.

A mould drum drive is coupled to the mould drum to drive the mould drum in a rotation direction. The drum may be driven at a non-continuous speed, possibly stepwise.

A mass feed member is arranged at a fill position relative to the outer circumferential drum surface. The mass feed member has a chamber with an inlet for foodstuff mass to introduce said foodstuff mass into the chamber and with a mouth facing the drum surface. The mass feed member is adapted to transfer foodstuff mass into passing mould cavities of the revolving mould drum when the fill opening of a mould cavity is in communication with the mouth at the fill position. The foodstuff mass forms a food product in the mould cavity, e.g. a meat patty, etc.

A foodstuff mass feed and pressurization system is adapted to feed foodstuff mass into the chamber of the mass feed member and via the mouth into the mould cavities.

A pressurized air food product ejection system is provided, wherein the mould drum has air ducts that extend to the mould cavities of the drum. At least a portion of the surface delimiting a mould cavity is air permeable, e.g. of porous material, e.g. sintered porous metal.

Each of the air ducts is adapted to transport pressurized air to one or more of the mould cavities so that the air passes through the air permeable mould cavity surface portion.

The pressurized air food product ejection system further comprises a pressurized air source that is operable to feed pressurized air at a regulated ejection air pressure thereof to one or more of the air ducts associated with one or more mould cavities in a product release position thereof so as to facilitate and/or cause ejection of the moulded food product from said one or more mould cavities at said product release position.

A controller, e.g. a programmed computerized controller, is linked to the foodstuff mass feed and pressurization system and is adapted to input at least one target parameter related to the filling of the mould cavities with the foodstuff mass via the mouth of the mass feed member. This at least one target parameter is one or more of:

- a target fill pressure for the foodstuff mass in the chamber of the mass feed member and/or in the mould cavity to be caused by said foodstuff mass feed and pressurization system, and/or
- a target volumetric flow rate for the foodstuff mass into the chamber of the mass feed member and/or into the mould cavity to be caused by said foodstuff mass feed and pressurization system, and/or
- a target rotational speed of the mould drum.

The controller is adapted or configured, e.g. a computerized controller is programmed, to automatically set said ejection air pressure by the pressurized air source on the basis of the inputted target parameter.

It is envisaged that if an operator chooses to increase the filling of the mould cavities, e.g. by increasing the target fill pressure, e.g. based on one or more quality aspects of the moulded food product, e.g. based on density and/or weight and/or thickness of the food product, the installation of the first aspect will automatically set an ejection air pressure that safeguards the proper air ejection of the moulded food product and, preferably, avoids too much air being wasted due to an unnecessary high air pressure.

Generally it is envisaged that the controller will be adapted to increase the ejection air pressure when the operator inputs an increased target fill pressure and/or increased volumetric flow rate and the controller will reduce the ejection air pressure when the operator inputs a reduced target fill pressure and/or reduced volumetric flow rate.

In some embodiments the inputted pressure and/or volumetric flow rate may not be a single value but, for example, a value over time parameter, e.g. in the form of a profile or graph representing said value over time, e.g. over the period of time it takes to fill a mould cavity or a row of mould cavities.

It is noted that the volumetric flow rate may effectively be influenced by the rotational speed (RPM) of the mould drum, e.g. diminishing when a feed pump is kept at a constant volumetric output and the speed of the drum increases, and therefore rotational speed of the drum may also be a target parameter, e.g. in combination with a target volumetric output of a feed pump, e.g. of a positive displacement feed pump.

For example the inventive installation of the first aspect will avoid the problematic situation that, during a production run, the operator inputs an increased target fill pressure which causes the foodstuff mass feed and pressurization system to effect said higher fill pressure, with the result being that the mass is stuck so hard in the mould cavity that the still unchanged air ejection is not capable to release the formed products, or not properly. In the prior art installation this problem may require stopping of the production, may require that incorrectly moulded products are removed, e.g. by hand, from the conveyor, etc. It is noted that in practical terms, e.g. when using a feed pump with a significant output pressure range for the foodstuff mass, the fill pressure may increase rather rapidly based on a new setting by the operator, e.g. within a few revolutions of the mould drum.

It is noted that setting the air ejection pressure at a high level in order to avoid the above problem from occurring all together, is no solution either, at least not a practical solution, as not only undue pressurized air consumption will take place but also products may become damaged due to being ejected by air at a too high pressure.

In an embodiment the controller comprises a memory wherein a list of selectable foodstuff masses is stored, e.g. representing different ground meat products, wherein the controller is adapted to input a selection of a foodstuff mass from said list of selectable foodstuff masses. The controller has a memory wherein a predetermined combination, in practice multiple combinations, is stored of on the one hand at least each selectable foodstuff mass and said target parameter and on the other hand said automatically set ejection air pressure. For example the list of selectable foodstuff masses comprises: ground poultry meat, lean ground beef, fatty ground beef, ground meat mixtures, ground pork, fish meat, etc.

In embodiments the duration of the flow of pressurized air into an air duct of the mould drum for the purpose of ejection of products, herein called a burst of air, may in embodiments depend on an air emitter mounted on the frame being in communication with an inlet of the air duct so that as long as said communication exists air will flow into the duct. The design of the air emitter and of the inlet than basically govern the duration of the ejection air flow in conjunction with the RPM of the drum. In another embodiment one can envisage that the duration is governed by an ejection air control valve, e.g. between a compressor or compressed air storage tank on the one hand and the ejection air emitter on the other hand. In another design an air control valve is integrated into the drum to govern the timing and duration of the flow of pressurized air into the duct for air ejection of products.

In an embodiment the controller comprises a memory wherein a list of selectable mould drums is stored, e.g. representing mould drums having differing mould cavities, wherein the controller is adapted to input a selection of a mould drum from said list of selectable mould drums, and wherein the controller has a memory wherein a predetermined combination is stored of on the one hand at least each selectable mould drum and said target parameter and on the other hand said automatically set ejection air pressure. This embodiment may e.g. include an automatic recognition of the actual mould drum that is in operation, e.g. using a transponder or other automatically readable identification on the mould drum, but might also require the operator to input which drum is being used. For example the one mould drum is provided with identical mould cavities of a first design and one or more other mould drums of the installation are each provided with identical mould cavities of second, third, etc., designs. In some embodiments a single mould drum may have groups of differently designed mould cavities, e.g. one or more rows of a first design of mould cavities and one or more rows of a second design of mould cavities.

In an embodiment the controller comprises a memory wherein a list of selectable mould drums, e.g. representing mould drums having differing mould cavities, and a list of selectable mass feed members or exchangeable mouth members thereof is stored, e.g. representing mouths having differing shapes and/or structures (e.g. a slotted mouth or an orificed mouth). The controller is adapted to input a selection of a mould drum from said list of selectable mould drums, and to input a selection of the mass feed member or exchangeable mouth members from said respective list. The controller has a memory wherein, for each selectable combination of mould drum and mass feed member or exchangeable mouth member, in combination thereof with the target parameter to be inputted, the automatically settable ejection air pressure is stored. This allows the operator to simply instruct which mould drum and mass feed member, or exchangeable mouth member thereof, are present, which could possibly be done automatically by suitable automated recognition devices, and to input the target parameter, e.g. fill pressure, upon which the controller will automatically set the appropriate ejection air pressure.

In an embodiment at least one mould drum is provided with at least a first air duct and a second air duct, each extending to a corresponding first and second group of mould cavities of said mould drum respectively. The mould cavities of said first group differ from said second group, e.g. with respect to one or more of the general shape, the surface area, the depth, the permeability of the mould surface, etc. The controller is adapted, e.g. a computerized controller is programmed, to automatically set a first group ejection air pressure for ejection of food products from said first group and a different second group ejection air pressure for ejection of food products from said second group by said pressurized air source on the basis of the inputted target parameter. For example a drum has alternating, in circumferential direction, rows of two different designs of mould cavities. Instead of providing a single air pressure for ejection of food products from said rows, this embodiment envisages the use of different ejection air pressures which are automatically adjusted in case the operator inputs a new target parameter related to the filling process.

This may be an adjustment that is different for the one row compared to another row having different mould cavities, so allowing optimal ejection and air use without being too demanding on the operator.

In an embodiment the controller comprises a memory wherein a list of selectable foodstuff masses and list of selectable mould drums is stored, and wherein the controller is adapted to input a selection of a foodstuff mass from said list of selectable foodstuff masses and to input a selection of a mould drum from said list of selectable mould drums. The controller has a memory wherein a predetermined combination is stored of on the one hand at least each selectable foodstuff mass, each selectable mould drum, and said target parameter and on the other hand said automatically set ejection air pressure.

It will be appreciated that the memory of the controller may store therein the specified target parameter(s) and other items in the form of tables, e.g. allowing the controller to directly read the automated setting of the air ejection pressure(s) from a table. In other designs, or in combination with the use of tables, the controller may make use of one or more algorithms to calculate the automated setting of the air ejection pressure(s), e.g. based on algorithm identifier(s) and/or variable values that are stored in the memory.

In order to allow the operator to have ultimate control of the production an embodiment envisages that the controller comprises an operator ejection air pressure override allowing an operator to override an automatically set ejection air pressure. In an embodiment the installation comprises a logging device storing all ejection air pressure settings in a logfile during production, e.g. in view of review of the settings and adjustment/fine tuning of the automated setting by the controller.

In an embodiment the installation comprises a warning indicator, e.g. an audible and/or visual alarm, in case air pressure, e.g. stored in a tank, becomes insufficient for proper operation of the air ejection.

In an embodiment the target parameter comprises, or consists solely of, the target fill pressure for the foodstuff mass in the chamber of the mass feed member and/or in the mould cavity (e.g. measured by a sensor in the drum or in the mass feed member directly adjoining the cavity during filling) to be caused by said foodstuff mass feed and pressurization system, wherein said automatically set ejection air pressure lies within 0.8 and 2 times the target fill pressure. So for a target fill pressure of 5 bars the controller may set an air ejection pressure between 4 and 10 bars.

In an embodiment the installation is adapted to allow the inputting of a target fill pressure that lies between 6 and 15 bar, and to cause such fill pressure, so at a very high level, e.g. for ground meat, e.g. red meat or beef. It is then preferred for the pressurized air source to be embodied such that it is operable to feed pressurized air at a controllable ejection air pressure that is between 4 and 18 bar, so in a wide range.

In an embodiment the pressurized air source for air ejection comprises an air compressor and an pressurized air storage tank having an inlet connected to said compressor and an outlet provided with an air release valve adapted to cause pulsed release of air from said tank into a duct in the mould drum associated with cavities at said food product release position. The air release valve preferably is a quick response open and close valve, e.g. a direct acting solenoid valve, so lacking a pressure regulating feature which means that the air is stored in the air storage tank at the desired air ejection pressure. In another embodiment the air release valve is embodied as a further air pressure control valve or associated with such a valve so that the air may be stored in the air storage tank at a higher pressure than the desired air ejection pressure. For example the air storage tank is adapted to store therein air at a pressure of at least 25 bars.

It will be appreciated that in embodiments the pressurized air food product ejection system further comprises a control of the duration of the air flow into the duct on the basis of the mentioned controller, e.g. said controller being linked to an ejection air control valve that governs the ejection air flow with regard to its duration. For example said duration is controlled to be, at least in some operations, shorter than the time of communication between an ejection air emitter and the inlet of a duct of the drum. Control of the duration of the air flow for air ejection is primarily envisaged to avoid undue consumption of pressurized air for this purpose, so as to avoid that air is kept being dispensed whilst the moulded product has already been effectively released from the mould cavity.

It will be appreciated that the first aspect of the invention also comprises embodiments wherein the controller is adapted, e.g. a computerized controller is programmed, to automatically set the ejection air pressure by said pressurized air source as well as the duration of the air flow into the duct from the pressurized air source on the basis of the inputted target parameter. This can e.g. be done by storing the appropriate information in a memory accessed by a computerized controller. Also in an embodiment provisions can be made for an operator to override the automatically set duration, e.g. to temporarily have a longer duration of the ejection air flow.

A second aspect of the invention relates to an installation according to the preamble of claim 11, wherein a pressurized air food product ejection system is present.

The mould drum has air ducts that extend to said cavities and at least a portion of the surface delimiting a mould cavity is air permeable, e.g. made of porous material, e.g. sintered metal, e.g. sintered stainless steel, as is known in the art. See for example WO2004/002229. Each duct is adapted to transport air to one or more of said mould cavities so that said air passes through said air permeable mould cavity surface portion. The ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position.

In practice many mould drums exist that each have only one design of mould cavities, i.e. all cavities form identical food products. For example these cavities are arranged in circumferentially spaced rows, e.g. rows parallel to the drum rotation axis. Examples are schematically shown in WO2004/002229.

For each row of cavities it is known to have a single dedicated, non-valved air duct, that extends from an inlet at an axial end of the drum to the cavities of the row, so that air injected into the air duct finds its way to the mould cavities and progresses through the air permeable surface of the mould cavities. The air is emitted by an air emitter that is stationary arranged in the moulding device, so that the inlets of the air ducts pass this emitter in succession and every time a pulse of pressurized air is injected into the aligned air duct inlet.

In practice mould drums exist, e.g. as suggested in EP2901862, wherein the mould drum is provided with multiple rows of mould cavities, including a first row and a second row of multiple cavities each, wherein the mould drum is further provided with at least a first air duct and a second air duct that extend to the corresponding first and second row of mould cavities of said mould drum respectively. Herein the mould cavities of the first row differ from said mould cavities of said second row so as to form differently shaped food products using a single drum.

In view of high demands that are placed on food product quality and consistency, the use of such "multi-product drums" has not been entirely satisfactory.

Therefore the second aspect of the invention aims to provide an improved installation, e.g. an installation that may be operated at a higher efficiency, e.g. the latter in view of production of food products and/or the use of rather costly compressed air for said air ejection.

The second aspect of the invention proposes an installation according to claim 11, wherein the pressurized air source is adapted to provide air at first group ejection air pressure to said first air duct for ejection of food products from said first group of mould cavities and to provide air to said second air duct at a different second group ejection air pressure for ejection of food products from said second group of mould cavities.

The approach of the second aspect allows, in embodiments, to optimize the air ejection for each group of mould cavities. This allows for enhanced product quality, reduced use of pressurized air, and/or greater degree of freedom when it comes to combining different mould cavities on a single drum.

In an embodiment the mould cavities of said first group are arranged in a first row and the mould cavities of said second group are arranged in a second row, said first and second rows being circumferentially spaced from one another.

In another embodiment the mould cavities of said first group and of said second group are arranged in a common row, e.g. alternating.

In a preferred practical embodiment the mould drum has first and second axial end portions, wherein said first air duct has an inlet at said first axial end portion, wherein pressurized air source comprises a first air emitter arranged adjacent said first axial end portion in order to provide air at first row ejection air pressure to said first air duct for ejection of food products from said first group of mould cavities, and wherein said second air duct has an inlet at said second axial end portion. The pressurized air source comprises a second air emitter arranged adjacent said second axial end portion in order to provide air at said second group ejection air pressure to said second air duct for ejection of food products from said second group of mould cavities. By using two air emitters at opposite axial ends of the drum a practical design of the drum and these air emitters is feasible. One could envisage that all the air ducts extend all the way through the length of the drum, e.g. with inlets at both axial ends. In operation then only one air emitter is used to feed in a burst of air, whereas the other air emitter effectively closes the other end of the air duct.

The second aspect of the invention also relates to a method wherein use is made of an installation as described herein, which method comprises:

revolving the mould drum about said drum rotation axis by means of said mould drum drive, feeding foodstuff mass into the chamber of the mass feed member and transferring said foodstuff mass via said mouth into said mould cavities of said mould drum, said foodstuff mass forming a food product in said mould cavity, feeding pressurized air at a regulated ejection air pressure thereof to one or more of said air ducts associated with one or more mould cavities in a product release position thereof so as to facilitate and/or cause ejection of the moulded food product from said one or more mould cavities at said product release position, which method is characterized in that use is made of mould drum that is provided with multiple groups of mould cavities, including a first group and a second group of multiple cavities each, wherein said mould drum is further provided with at least a first air duct and a second air duct, said first and second air ducts extending to the corresponding first and second group of mould cavities of said mould drum respectively, and in that said mould cavities of said first group differ from said mould cavities of said second group, and in that said pressurized air source provides air at first group ejection air pressure to said first air duct for ejection of food products from said first group of mould cavities and provides air to said second air duct at a different second group ejection air pressure for ejection of food products from said second group of mould cavities.

A third aspect of the invention relates to a moulding installation for moulding food products from a pumpable foodstuff mass, which installation which comprises:

a frame, a mould drum having an outer circumferential drum surface and a longitudinal drum rotation axis, the mould drum being rotatably supported by the frame to revolve about the drum rotation axis, wherein said outer circumferential drum surface comprises multiple mould cavities, each mould cavity having a fill opening for introduction of foodstuff mass into the mould cavity, a mould drum drive coupled to the drum to drive the drum in a rotation direction, a mass feed member arranged at a fill position relative to the outer circumferential drum surface, said mass feed member having a chamber with an inlet for foodstuff mass to introduce said foodstuff mass into the chamber and with a mouth facing the drum surface, said mass feed member being adapted to transfer foodstuff mass into passing mould cavities of the revolving mould drum when the fill opening of a mould cavity is in communication with the mouth at said fill position, said foodstuff mass forming a food product in said mould cavity, a foodstuff mass feed and pressurization system adapted to feed foodstuff mass into the chamber of the mass feed member and via said mouth into said mould cavities, a pressurized air food product ejection system, wherein the mould drum has air ducts that extend to said cavities and at least a portion of the surface delimiting a mould cavity is air permeable, e.g. of porous material, wherein each duct is adapted to transport pressurized air to one or more of said mould cavities so that said air passes through said air permeable mould cavity surface portion, and wherein said pressurized air food product ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position, a controller which is adapted, e.g. a computerized controller is programmed, to automatically increase the air ejection pressure that has been set at first instance, e.g. automatically as described herein or manually, over time during production in order to compensate for any impact of soiling of the cavity surface by the foodstuff mass.

The third aspect of the invention aims to safeguard proper ejection of products even in case foodstuff masses and/or fill pressures are employed that cause soiling over time, which soiling may impair the effective ejection of the food products. The desired increase may be developed empirically.

For example the controller increases the air ejection pressure based on time expired since starting production with a clean mould drum, or on the basis of the number of filling events per cavity since the clean start.

The third aspect of the invention is considered advantageous in particular when using porous material to form the mould cavities.

The controller may also take into account the actual foodstuff mass that is being handled by the installation, e.g. adapting the mentioned increase to the actual foodstuff mass.

The third aspect of the invention also relates to a method wherein use is made of an installation as described, wherein the controller automatically increases the air ejection pressure that has been set at first instance, e.g. automatically as described herein or manually, over time during production in order to compensate for any impact of soiling of the cavity surface by the foodstuff mass.

A fourth aspect of the invention relates to a moulding installation for moulding food products from a pumpable foodstuff mass, which installation comprises:

a frame, a mould drum having an outer circumferential drum surface and a longitudinal drum rotation axis, the mould drum being rotatably supported by the frame to revolve about the drum rotation axis, wherein said outer circumferential drum surface comprises multiple mould cavities, each mould cavity having a fill opening for introduction of foodstuff mass into the mould cavity, a mould drum drive coupled to the drum to drive the drum in a rotation direction, a mass feed member arranged at a fill position relative to the outer circumferential drum surface, said mass feed member having a chamber with an inlet for foodstuff mass to introduce said foodstuff mass into the chamber and with a mouth facing the drum surface, said mass feed member being adapted to transfer foodstuff mass into passing mould cavities of the revolving mould drum when the fill opening of a mould cavity is in communication with the mouth at said fill position, said foodstuff mass forming a food product in said mould cavity, a foodstuff mass feed and pressurization system adapted to feed foodstuff mass into the chamber of the mass feed member and via said mouth into said mould cavities, a pressurized air food product ejection system, wherein the mould drum has air ducts that extend to said cavities and at least a portion of the surface delimiting a mould cavity is air permeable, e.g. of porous material, wherein each air duct is adapted to transport air to one or more of said mould cavities so that said air passes through said air permeable mould cavity surface portion, and wherein said ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position, which is characterized in that the installation further comprises a mould cavity air purging assembly that is operable and controllable independent from said pressurized air food product ejection system and is adapted to feed a burst of pressurized air from a pressurized air source to said one or more of said air ducts associated with said one or more mould cavities when in a mould cavity air purge position thereof that is located intermediate the product release position and the fill position of said associated one or more mould cavities so as to cause loosening and/or removal of residue of foodstuff mass by said burst of pressurized air after ejection of the moulded food product has taken place and prior to filling the mould cavity for forming a product in said mould cavity.

It is understood that some foodstuff masses, e.g. fatty ground beef, exhibit the tendency to slowly, yet progressively, built-up on the surface of the mould cavity, e.g. as a thin layer or spots of fatty material. The depositing of residue of foodstuff mass arises in particular when at least part of the mould cavity is made of porous material, e.g. porous sintered metal, which is a material known in the art of these installations and drums thereof. The residue deposit may be on the surface of the mould cavity, but may also be in the porous material itself. By bursting air into the air duct or ducts leading to the empty mould cavity or row of cavities, the residue is subjected to a mechanical force that causes the residue to loosen or become totally dislodged and removed. This process is preferably done whilst the installation is in operation for production of food products and does not interfere with said production.

In a practical embodiment the mould drum has first and second axial end portions, and the air ducts each have an inlet at one or both of said first and second axial end portions, wherein the pressurized air food product ejection system comprises a product ejection air emitter at said product release position and connected via an ejection air control valve to a pressurized air source in order to provide air to a duct associated with the one or more products to be ejected at said product release position. Distinct from and downstream of said product ejection air emitter, the installation is provided with a purging air emitter that is connected via a purging air control valve to a pressurized air source, possibly the same pressurized air source as used in the pressurized air food product ejection system. This purging air emitter provides air to a duct when the associated one or more mould cavities are at said mould cavity air purge position.

For example the purging air bursts are performed with air at another pressure than the air fed into the duct for the purpose of ejection of the moulded food product. For example the purging air burst are performed with air at a higher pressure than for ejection, e.g. over a shorter period at a higher pressure.

Preferably a residue collector is located at said mould cavity air purge position in order to collected dislodged foodstuff mass residue. For example the residue collector includes a vacuum system that sucks up any residue and conveys the residue into a collector container.

Preferably said mould cavity air purging assembly is adapted to cause said purging bursts of air at a selectable frequency, e.g. one burst per cavity or row of cavities connected to a duct per multiple revolutions of the drum, e.g. said frequency being settable by an operator of the installation and/or based on an automated routine run on a programmed controller. This allows for effective purging whilst avoiding undue consumption of pressurized air for this purpose.

For example the mould cavity air purging assembly is controlled by a computerized controller which is programmed to control the bursts of air for purging on the basis of at least one of: foodstuff mass handled by the installation, time or number of filling events expired since first use of cleaned mould drum, target fill pressure, or any combinations thereof. The control may involve setting the pressure and/or duration of the burst.

The fourth aspect of the invention also relates to a method for moulding food products from a pumpable foodstuff mass, wherein use is made of the installation and air purging is performed as described. For example the method involves setting the frequency of the purging bursts, e.g. via the operator and/or by an automated routine performed by a suitably programmed controller.

A fifth aspect of the invention relates to a moulding installation for moulding food products from a pumpable foodstuff mass, which installation comprises:
  a frame,
  a mould drum having an outer circumferential drum surface and a longitudinal drum rotation axis, the mould drum being rotatably supported by the frame to revolve about the drum rotation axis,
  wherein said outer circumferential drum surface forms multiple mould cavities, each mould cavity having a fill opening for introduction of foodstuff mass into the mould cavity,
  a mould drum drive coupled to the drum to drive the drum in a rotation direction,
  a mass feed member arranged at a fill position relative to the outer circumferential drum surface, said mass feed member having a chamber with an inlet for foodstuff mass to introduce said foodstuff mass into the chamber and with a mouth facing the drum surface, said mass feed member being adapted to transfer foodstuff mass into passing mould cavities of the revolving mould drum when the fill opening of a mould cavity is in communication with the mouth at said fill position, said foodstuff mass forming a food product in said mould cavity,
  a foodstuff mass feed and pressurization system adapted to feed foodstuff mass into the chamber of the mass feed member and via said mouth into said mould cavities,
  a pressurized air food product ejection system, wherein the mould drum has air ducts that extend to said cavities and at least a portion of the surface delimiting a mould cavity is air permeable, e.g. of porous material, wherein each duct is adapted to transport air to one or more of said mould cavities so that said air passes through said air permeable mould cavity surface portion,
  and wherein said ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position,
  which is characterized in that
  the pressurized air source is adapted to regulate the pressure of ejection air so as to provide air to each air duct at a variable pressure level during a single air ejection event, for instance first at a lower air pressure and then at a higher air pressure.

For example the pressurized air source comprises a first air storage tank storing air at a relatively high pressure and a second storage tank storing air at a relatively low pressure, an ejection air emitter being connected to both said first and second storage tank via a valve assembly, and said valve assembly being adapted and operated to release—during a single ejection event—air from said first air storage tank during one part of the duration of the ejection event and air from the second storage tank during the other part of the duration of the ejection event. In an embodiment first the second storage tank is opened so that air at relatively, compared to the higher pressure in the first storage tank, low second pressure is fed into the duct, causing an initial release of the moulded product from the cavity, and then a burst of higher pressure air from the first storage tank is used to cause the released product to be effectively emitted from the cavity. In embodiments one can also envisage the initial application of the first air pressure and then the second air pressure. For example in an embodiment wherein the air ducts of the drum have inlets or openings at both axial ends of the drum one can envisage the provision of two air emitters at the opposed axial ends, the one air emitter being connected via a valve to the first storage tank and the second ejection air emitter being connected via a valve to the second storage tank.

The use of variable pressure level, e.g. two distinct pressure levels, of the ejection air during a single air ejection event may serve to optimize the release and ejection of moulded food products as well as serve to optimize the use of pressurized air for this purpose. It will be appreciated that, if desired, more complex arrangements are possible to obtain a variation of air pressure over the duration of a single air ejection event, e.g. using rapidly responding air pressure control valve.

The fifth aspect of the invention also relates to a method for moulding food products from a pumpable foodstuff mass, wherein use is made of the installation and air ejection is performed as described.

The sixth aspect of the invention relates to a mould drum for use in a moulding installation for moulding food products from a pumpable foodstuff mass, which installation comprises:
a frame,
said mould drum having an outer circumferential drum surface and a longitudinal drum rotation axis, the mould drum being rotatably supported by the frame to revolve about the drum rotation axis,
wherein said outer circumferential drum surface forms multiple mould cavities, each mould cavity having a fill opening for introduction of foodstuff mass into the mould cavity,
a mould drum drive coupled to the drum to drive the drum in a rotation direction,
a mass feed member arranged at a fill position relative to the outer circumferential drum surface, said mass feed member having a chamber with an inlet for foodstuff mass to introduce said foodstuff mass into the chamber and with a mouth facing the drum surface, said mass feed member being adapted to transfer foodstuff mass into passing mould cavities of the revolving mould drum when the fill opening of a mould cavity is in communication with the mouth at said fill position, said foodstuff mass forming a food product in said mould cavity,
a foodstuff mass feed and pressurization system adapted to feed foodstuff mass into the chamber of the mass feed member and via said mouth into said mould cavities,
a pressurized air food product ejection system, wherein the mould drum has air ducts that each extend to multiple of said cavities and at least a portion of the surface delimiting each mould cavity is air permeable, e.g. of porous material, wherein each air duct is adapted to transport air to said mould cavities so that said air passes through said air permeable mould cavity surface portion,
and wherein said ejection system further comprises a pressurized air source that is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position, which is characterized in that in each air duct one or more air flow resistor members are arranged that are embodied to optimize, e.g. equalize, the effective flow of air through the air permeable surface of the mould cavities communicating with said air duct.

For example with the mould cavities being made at least in part of porous material one can envisage that at the face thereof directed towards the air duct the flow resistor is a non-permeable membrane that covers a desired portion of the otherwise exposed entry face for the burst of air used for air ejection through the porous material. Preferably the membranes are removable, e.g. as the mould cavities are designed as removable inserts in the body of the drum and the membrane lies underneath the respective insert, and/or with the drum having an inner drum member and an outer drum member that is removable, e.g. by axial sliding, from the inner drum member and the one or more membranes being located at the interface.

The sixth aspect of the invention may be advantageous for example for long length drums, e.g. having a length of 1000 mm or even more, in particular when air is supplied to the air ducts at one axial end thereof only. This may cause a pressure drop over the length of the air duct causing the air ejection of products from a row of, often identical, mould cavities to be non-uniform. The presence of flow resistors of suitable design may be employed to counter this effect and to cause a uniform ejection of food products within a row.

For example the flow resistor members are exchangeable in order to allow an operator to tweak the permeability of each mould cavity surface on the basis of experimental runs of the installation.

In another design the flow resistor members are adjustable, e.g. with a screw type member to control a resistor flow cross-section, e.g. without having to remove the flow resistor member from the mould drum.

The sixth aspect of the invention also relates to the mentioned installation including the mould drum and to a method wherein such installation is operated.

It will be appreciated that the installation and/or methods according to the mentioned aspects of the invention, as well as one or more preferred and/or optional details thereof as described herein, can be readily combined when desired.

Figure 3A:
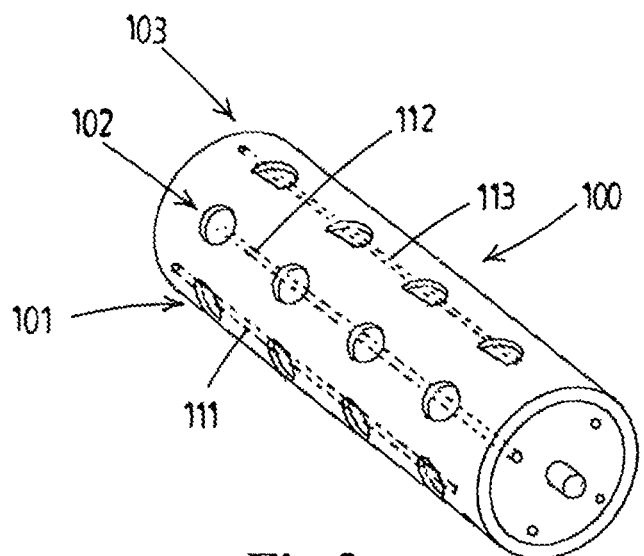

The aspects of the invention will now be described with reference to the drawings. In the drawings:

FIG. 1 shows an example of a moulding installation for moulding food products from a pumpable foodstuff mass according to the invention, FIG. 2 illustrates the moulding of food products and pressurized air ejection of the moulded food products from the mould drum of FIG. 1, FIGS. 3a, b illustrate an embodiment of a mould drum and pressurized air ejection system according to the invention.

Figure 4:
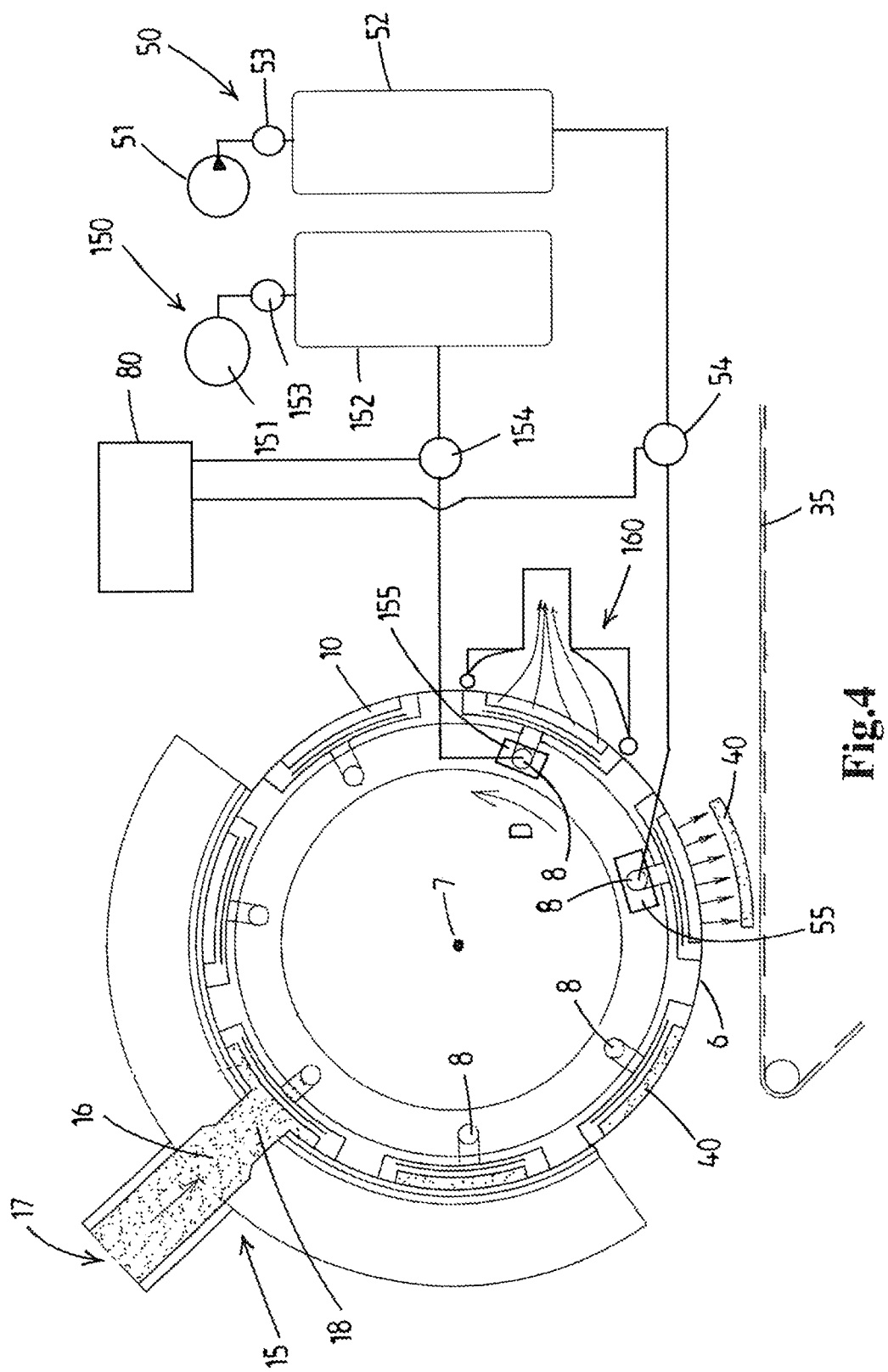
Figure 5:
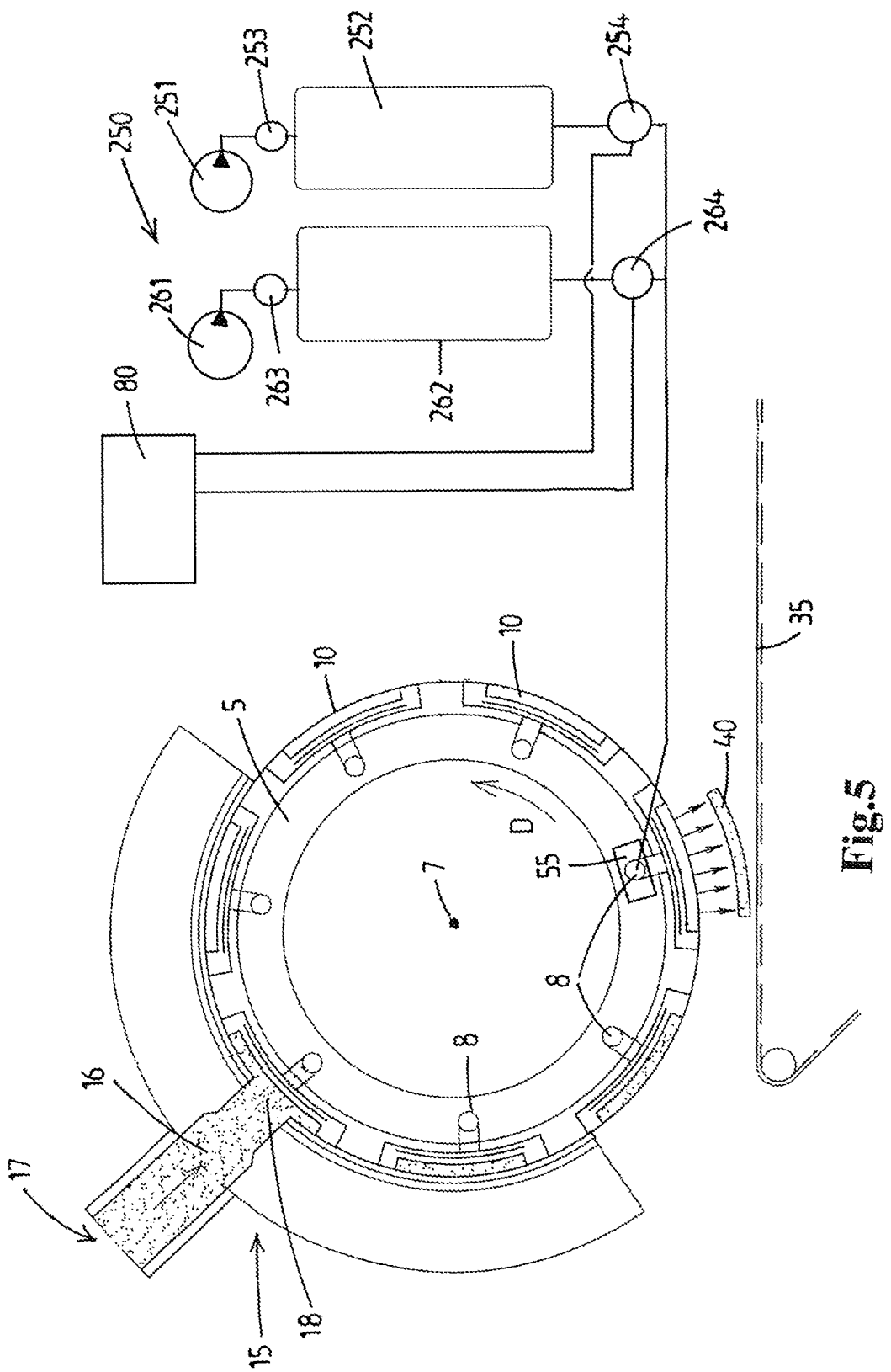
Figure 6A:
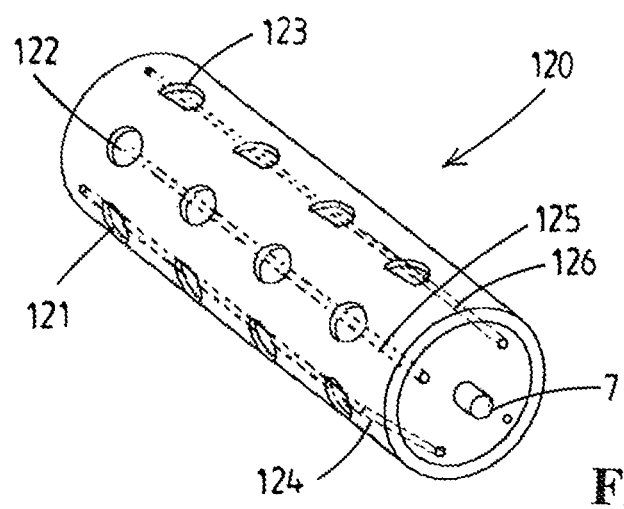

FIG. 4 illustrates the moulding of food products, pressurized air ejection of the moulded food products, and air purging of mould cavities according to at least the fourth aspect of the invention, FIG. 5 illustrates the moulding of food products and pressurized air ejection of the moulded food products according to at least the fifth aspect of the invention, FIGS. 6a, b illustrate another embodiment of a mould drum and pressurized air ejection system according to the invention.

With reference to FIGS. 1 and 2 a moulding installation for moulding food products from a pumpable foodstuff mass will be discussed here first.

The installation is for example envisaged for the production of food products from ground meat, e.g. ground poultry meat, ground beef, ground pork, mixtures of ground meat, etc. For example the installation is embodied to mould patties, nuggets, drumstick resembling meat products, or the like.

The installation comprises in this embodiment a moulding device 1 and a pump device 20, e.g. a meat pump device 20.

The moulding device 1 comprises a frame 2, here a wheeled frame allowing to ride the machine over a floor of a production plant.

The device 1 further comprises a mould drum 5 having an outer circumferential drum surface 6 and a longitudinal drum rotation axis 7. The drum 5 is rotatably supported by the frame 2 to revolve about the drum rotation axis 7.

The outer circumferential drum surface forms multiple mould cavities 10, here in multiple circumferential series of multiple mould cavities each. FIG. 2 shows one such series in cross-sectional view of the drum 5. Each mould cavity 10 has a fill opening for introduction of foodstuff mass into the mould cavity.

In the depicted example the drum 5 the cavities are all embodied as recesses formed in the cylindrical circumference of the drum. Other designs are also possible, e.g. as depicted in WO2014/148897.

A mould drum drive MD is coupled to the drum 5 to drive the drum in a rotation direction D, e.g. at a constant speed or in some other fashion, e.g. intermittently or with variable speed, e.g. slow or stopped when filling of a row of mould cavities 10 takes place and faster in between two successive rows of mould cavities.

A mass feed member 15 is arranged at a fill position relative to the outer circumferential drum surface 6. This mass feed member has a chamber 16 with an inlet 17 for foodstuff mass to introduce said foodstuff mass into the chamber and with a mouth 18 facing the drum surface 6. The mass feed member 15 is adapted to transfer foodstuff mass into passing mould cavities 10 of the revolving mould drum 5, e.g. in a row per row manner, when the fill opening of a mould cavity, or of a row of mould cavities, is in communication with the mouth 18 at this fill position. The foodstuff mass forms a food product in the mould cavity 10.

The mouth 18 can for example have the shape of an elongated, e.g. straight slot, extend parallel to the drum axis 7, wherein the width of the slot is smaller than the corresponding circumferential dimension of the mould cavities 10. In another, known, embodiment the mouth be embodied with an orificed outlet structure having multiple orifices, e.g. over a surface that matches approximately the size of the filling opening of the mould cavity.

In an embodiment with an orificed mouth having a multitude of orifices to fill the passing cavities, e.g. arranged in rows or otherwise, the pressure to be exerted on the mass may be relatively high due to the resistance that the mass experiences when passing through the orifices.

As part of a foodstuff mass feed and pressurization system of the installation the pump device 20 comprises a pump 25 with drive motor MP, e.g. an electrically driven, variable RPM, rotary vane pump as schematically depicted here.

The installation comprises a hopper 30 into which the foodstuff mass is introduced, e.g. batches of ground meat mass. The hopper 30 is connected to the inlet of the pump 25. In an embodiment the hopper 30 is equipped with one or more augers to advance the mass to said pump inlet.

The pump P feeds the mass to the inlet 17 of the mass feed member, and in this example, in absence of any other means that can pressurize the mass before transfer into the mould cavity 10, this pump P controls the pressure of the mass in the chamber 16. The mass then flows via the mouth 18 in the mould cavities, e.g. into a row of mould cavities.

In embodiments the mass feed member mouth may be a single elongated slot shaped mouth, e.g. spanning the series of mould cavities on the drum. In other embodiments the mouth may be an orificed mouth formed by a multitude of outlet orifices so that rather small substreams of mass enter into the mould cavity. Other embodiments of the mouth are also possible.

FIGS. 1 and 2 also illustrate a pressurized air food product ejection system. The mould drum has air ducts 8 that extend, e.g. from one axial end face of the drum, to the cavities 10. In this example each duct 8 extends to a corresponding row of cavities 10, the row being generally parallel to the drum axis 7.

As illustrated, and as known in the field, the drum 5 is embodied such that at least a portion of the surface that delimits a mould cavity 10 is air permeable. In the example each cavity 10 is formed by a porous material insert 11 that is mounted in the body of the drum so that air can flow from the respective duct 8 through the porous material, e.g. sintered stainless steel. This air is introduced, more or less as a burst of pressurized air, into the duct 8 at a release position relative to the drum 5, so that ejected/released food products 40 fall out of the respective cavity 10 and onto a product conveyor 35 that extends underneath the drum 5.

The ejection system comprises a pressurized air source 50, e.g. a compressor 51 with a pressurized air storage tank 52 and a pressure regulating valve 53 and an air control valve 54 at the outlet of the tank 52. This source 50 is operable to feed pressurized air at a regulated ejection air pressure thereof to an air emitter 55 that is arranged near the revolving drum 5. In operation the inlets of the ducts 8 of the drum sequentially pass the air emitter 55 and align therewith; the valve 54 is then briefly opened to emit a burst of air into the duct 8. This air then flows out of permeable surface and, as is known in the field, facilitates and/or causes ejection of the moulded food product from said one or more mould cavities at the product release position as is depicted in FIG. 2.

A computerized controller 80 of the installation is linked, e.g. by cable and/or wireless, to the pump device 20. The controller 80, e.g. via a touchscreen with graphic user interface, is adapted to allow for inputting, e.g. by an operator of the installation, of at least one target parameter related to filling of the mould cavities with the foodstuff mass via the mouth 18 of the mass feed member.

The mentioned at least one target parameter that can be inputted into the controller 80 is:

a target fill pressure for the foodstuff mass in the chamber (16) of the mass feed member and/or in the mould cavity to be caused by said foodstuff mass feed and pressurization system, here by operation of the pump 25, and/or a target volumetric flow rate for the foodstuff mass into the chamber of the mass feed member and/or into the mould cavity to be caused by said foodstuff mass feed and pressurization system, and/or a target rotational speed (RPM) of the mould drum 5.

The computerized controller 80 is programmed, e.g. on the basis of dedicated software loaded and run on the computer, to automatically set an ejection air pressure by the pressurized air source 50 on the basis of the inputted target parameter.

For example the controller 80 comprises a memory wherein a list of selectable foodstuff masses is stored, e.g. representing different ground meat products such as lean and compound ground red meat. Herein the controller is adapted to input a selection of a foodstuff mass from this list of selectable foodstuff masses. The controller has a memory wherein a predetermined combination is stored of on the one hand at least each selectable foodstuff mass and the target parameter to be inputted and on the other hand said automatically set ejection air pressure. By selecting the food stuff mass, e.g. also by means of the touchscreen, and by inputting the target parameter, the controller will automatically find the associated air ejection pressure in the memory, e.g. in the form of a table, and will steer the air source 50 to create this air ejection pressure. This means that when switching from one foodstuff mass to another, the operator will only have to select the mass and the target parameter, and the controller will then reliably set the correct ejection air pressure.

As operators of these installation commonly prepare differently shaped food products using different mould drums 5, they commonly have available at the production location multiple different drums 5. When switching from one shape of product to another, the one drum is removed from the moulding device and another is installed. For this situation it is advantageous when the controller 80 comprises a memory wherein a list of selectable mould drums 5 is stored, e.g. representing mould drums having differing mould cavities 10. The controller is then adapted to input a selection of a mould drum from said list of selectable mould drums, e.g. on the basis of an automated recognition of the mould drum, e.g. using an automated code reader, e.g. using a transponder, but a manual selection of the drum is also possible. Then it is envisaged that the controller has a memory wherein a predetermined combination is stored of on the one hand at least each selectable mould drum and the target parameter to be inputted, and on the other hand the automatically settable ejection air pressure. So then the computerized controller will automatically set the ejection air pressure that is effective for the selected mould drum.

It will be appreciated that more complex versions are possible, wherein the controller stores in its memory for each selectable drum a predetermined combination of on the one hand at least each selectable foodstuff mass and the target parameter to be inputted and on the other hand said automatically set ejection air pressure. Further complex versions will be apparent to the skilled person.

The automatic selection and setting of the air ejection pressure by the controller, preferably computerized controller, may also involve the factor of progressive soiling of the mould drum. One can envisage that over time, during production, small bits of the foodstuff mass may stick to the surface of the mould drum even though the air ejection causes loosening of foodstuff from the surface. This soiling may possibly reduce, e.g. locally, the air permeability of the surface, e.g. in case of a porous material forming a portion of the cavity surface. In an embodiment the controller is adapted to automatically vary, e.g. on the basis actual operating time starting from a cleaned condition of the mould drum, the ejection pressure in order to compensate for any effect of soiling of the mould drum on the air ejection process. For example the air ejection pressure that is set at first instance, e.g. as described above, is automatically gradually or stepwise increased over time, e.g. until the cleaning of the drum is performed (which may be done whilst the drum is on the mould device, e.g. using hot water from a high pressure sprayer). In an embodiment the installation is adapted to graphically display the automatically variation of the air ejection over time during a production process, e.g. to inform the operator about this automatic variation and the current status.

FIGS. 3a, b illustrate a mould drum 100 having multiple rows, e.g. 101, 102, 103, of multiple mould cavities each. These rows are spaced apart in circumferential direction of the outer surface of the drum 100. Each row, here of four cavities, forms a group of multiple cavities in terms of the second aspect of the invention.

The mould drum 100 is further provided with air ducts 111,112,113, that respectively are connected or in communication with a dedicated row, 101, 102, 103 of mould cavities respectively.

As can be seen the mould cavities of the rows 101, 103 are all the same, whereas the cavities of row 102 are different in design to make another shaped food product.

Figure 3B:
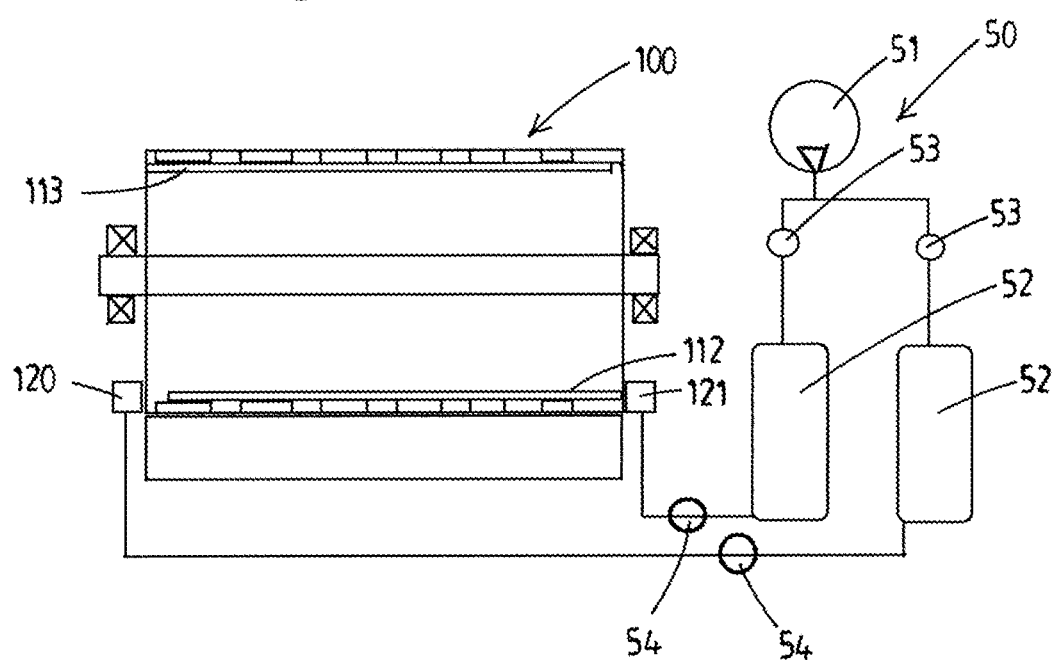

In FIG. 3a it is depicted that ducts 111, 113 have an inlet at one (not visible) end of the mould drum 100, e.g. as is known in a front axial face of the drum, whereas the duct 112 has an inlet at the opposed axial end of the drum 100, here also in the front axial face. FIG. 3b illustrates the drum 100 and the pressurized air ejection system to is used in combination with the drum 100. This system comprises the ducts 111,112,113 in the drum as well as a pressurized air source with a compressor, two storage tanks for compressed air, two pressure regulator valves (each to regulate the pressure in a respective tank, allowing to set different pressure levels in the storage tanks), and at the outlet of each tank an air control valve.

Also a first air emitter 120 is arranged adjacent said first axial end portion of the revolving mould drum in order to provide air at first row ejection air pressure to the air ducts 111, 113, for ejection of food products from said rows of mould cavities, and a second air emitter 121 is arranged adjacent the opposed axial end portion in order to provide air at said second row ejection air pressure to said second air duct 112 for ejection of food products from said second row of mould cavities.

The depicted approach allows for optimizing the air ejection from each row taking into account the presence of at least two rows with mould cavities that differ from the one row to the next.

For example the controller 80 is adapted, e.g. a computerized controller is programmed, to automatically set a first group ejection air pressure for ejection of food products from said first group 101 and a different second group ejection air pressure for ejection of food products from said second group 102 by the pressurized air source on the basis of the inputted target parameter. The controller 80 then controls the valves 54 so that the respective tank is connected to the desired air duct and so to have the appropriate air ejection for ejecting products from the row of mould cavities.

The same approach may also be done for a mould drum wherein the different mould cavities are not organized row per row, but for example a row comprises an alternation of cavity designs.

Referring to FIG. 4 now the fourth aspect of the invention will be elucidated. It will be appreciated that the mould drum 5 is understood to be rotatably supported by a frame, e.g. of the device shown in FIG. 1, to revolve about drum rotation axis 7 in direction D. If desired the rotation of the drum 5 can be at continuous speed, or in a start-stop manner, e.g. periodically slowing and accelerating to have a mould cavity or row of mould cavities at standstill or low speed when in communication with mouth 18.

The mass feed member 15 arranged at a fill position relative to the outer circumferential drum surface 6 and has a chamber with an inlet 17 for foodstuff mass to introduce said foodstuff mass into the chamber 16 and with mouth 18 facing the drum surface 6. As common in this field the mass feed member 15 is adapted to transfer foodstuff mass into passing mould cavities of the mould drum 5 when the fill opening of a mould cavity 10 is in communication with the mouth 18 at the fill position. The foodstuff mass then forms a food product in the mould cavity, e.g. a meat product, e.g. of ground beef. The mouth may be orificed with a multitude of orifices so that the mass streams as many substreams into a mould cavity.

The FIG. 4 does not illustrate a foodstuff mass feed and pressurization system, which may comprise a pump 25 connected to the inlet 17 of the mass feed member. This system is generally adapted to feed foodstuff mass into the chamber 16 of the mass feed member 15 and via the mouth 18 into the mould cavities 10 of the drum 5.

The FIG. 4 illustrates a pressurized air food product ejection system, wherein the mould drum 5 has air ducts 8 that extend to the mould cavities 10 (e.g. one air duct per longitudinal row of mould cavities). At least a portion of the surface delimiting a mould cavity 10 is air permeable, e.g. of porous material, e.g. of porous sintered metal. Each duct 8 is adapted to transport air to one or more of said mould cavities 10 so that said air passes through said air permeable mould cavity surface portion.

This air ejection system further comprises a pressurized air source 50 that is operable to feed pressurized air at a regulated ejection air pressure thereof to the air ducts 8 associated with one or more mould cavities 10 in a product release position thereof, here near the bottom part of the circular trajectory above the conveyor 35, so as to facilitate and/or cause ejection of the moulded food product 40 from the one or more mould cavities 10 at this product release position.

The ejection system comprises an air compressor 51, a pressurized air storage tank 52, a pressure regulating valve 53, and an air control valve 54 at the outlet of the tank 52. This source 50 is operable to feed pressurized air at a regulated ejection air pressure thereof to an air emitter 55 that is arranged on the frame near, e.g. close to the axial end of, the drum 5. In operation the inlets of the ducts 8 of the drum sequentially pass the air emitter 55 and align therewith; the valve 54 is then briefly opened to emit a burst of air into the duct 8. This air then flows out of permeable surface of the one or more cavities 10 connected to said duct 8 and, as is known in the field, facilitates and/or causes ejection of the moulded food product from said one or more mould cavities at the product release position as is depicted in FIG. 4.

In addition to pressurized air being used in the process of ejection of moulded products from the drum, pressurized air is now also being used in the process of counteracting soiling of the mould drum, e.g. counteracting the built-up of a layer of residue on the permeable surface of the mould cavity.

FIG. 4 illustrates that the installation further comprises a mould cavity air purging assembly 150 that is operable and controllable independent from the pressurized air food product ejection system and is adapted to feed a burst of pressurized air from a pressurized air source to said one or more of said air ducts 8 associated with one or more mould cavities 10 when in a mould cavity air purge position thereof that is located intermediate the product release position and the fill position of said associated one or more mould cavities so as to cause loosening and/or removal of residue of foodstuff mass by said burst of pressurized air after ejection of the moulded food product has taken place and prior to filling the mould cavity for forming a product in said mould cavity.

In more detail the mould cavity air purging assembly 150 here comprises a second air compressor 151, a second pressurized air storage tank 152, a second pressure regulating valve 153, and a second or purging air control valve 154 at the outlet of the second air tank 152. This assembly further includes a second or downstream, relative to the first air emitter 55, air emitter 155 that is arranged on the frame near, e.g. close to the axial end of, the drum 5. In operation the inlets of the ducts 8 of the drum sequentially pass the air purging air emitter 155 and align therewith; the valve 154 is then briefly opened to emit a burst of air into the duct 8. By bursting air into the duct 8 or ducts leading to the empty mould cavity 10 or row of emptied cavities 10, any residue of the foodstuff mass is subjected to a mechanical force that causes the residue to loosen or become totally dislodged and removed. This process is done whilst the installation is in operation for production of food products and does not interfere with the production.

FIG. 4 illustrates that a residue collector 160 is located this mould cavity air purge position relative to the drum surface 6 in order to collected dislodged foodstuff mass residue. For example the residue collector includes a vacuum system that sucks up any residue and conveys the residue into a collector container, e.g. using a suction fan and a separator device, like for example a cyclone separator.

It will be appreciated that the air ejection process and the air purging process are operable independent from one another. This for example, as preferred, allows cause, e.g. by the programmed controller 80, said purging bursts of air by means of assembly 150 at a selectable frequency, e.g. one burst per cavity or row of cavities connected to a duct per multiple revolutions of the drum, e.g. once every five revolutions of the drum.

For example the air purging frequency is settable by an operator of the installation and/or based on an automated routine run on the programmed controller 80. By having the option to set the frequency of the purging one can obtain effective purging whilst avoiding undue consumption of pressurized air for this purpose.

Another possibility brought along by having independent air purging is that the purging air bursts may be performed with air at another pressure than the air fed into the duct for the purpose of ejection of the moulded food product. For example the purging air burst are performed with air at a higher pressure than for ejection, e.g. for a shorter period. So one could envisage tank 152 being held at higher pressure than tank 52.

Instead of or in combination with an operator setting one or more of the parameters, e.g. pressure, frequency, timing, and/or duration, of the purging air bursts, one can envisage that the mould cavity air purging assembly is controlled by computerized controller 80 which is programmed to control the bursts of air for purging on the basis of at least one of: foodstuff mass handled by the installation, time or number of filling events expired since first use of cleaned mould drum, target fill pressure, or any combinations thereof. The control may involve setting the pressure and/or duration of the burst.

It will be appreciate that the purging process described herein does not interfere with the moulding of food products nor with the ejection thereof from the drum 5.

With reference to FIG. 5 now the fifth aspect of the invention will be elucidated. It will be appreciated that the mould drum 5 is understood to be rotatably supported by a frame, e.g. of the device shown in FIG. 1, to revolve about drum rotation axis 7 in direction D. If desired the rotation of the drum 5 can be at continuous speed, or in a start-stop manner, e.g. periodically slowing and accelerating to have a mould cavity or row of mould cavities at standstill or low speed when in communication with mouth 18.

The mass feed member 15 arranged at a fill position relative to the outer circumferential drum surface 6 and has a chamber with an inlet 17 for foodstuff mass to introduce said foodstuff mass into the chamber 16 and with mouth 18 facing the drum surface 6. As common in this field the mass feed member 15 is adapted to transfer foodstuff mass into passing mould cavities of the mould drum 5 when the fill opening of a mould cavity 10 is in communication with the mouth 18 at the fill position. The foodstuff mass then forms a food product in the mould cavity, e.g. a meat product, e.g. of ground beef. The mouth may be orificed with a multitude of orifices so that the mass streams as many substreams into a mould cavity.

The FIG. 5 does not illustrate a foodstuff mass feed and pressurization system, which may comprise a pump 25 connected to the inlet 17 of the mass feed member. This system is generally adapted to feed foodstuff mass into the chamber 16 of the mass feed member 15 and via the mouth 18 into the mould cavities 10 of the drum 5.

The FIG. 5 illustrates a pressurized air food product ejection system, wherein the mould drum 5 has air ducts 8 that extend to the mould cavities 10 (e.g. one air duct per longitudinal row of mould cavities). At least a portion of the surface delimiting a mould cavity 10 is air permeable, e.g. of porous material, e.g. of porous sintered metal. Each duct 8 is adapted to transport air to one or more of said mould cavities 10 so that said air passes through said air permeable mould cavity surface portion.

This air ejection system further comprises a pressurized air source 250 that is operable to feed pressurized air at a regulated ejection air pressure thereof to the air ducts 8 associated with one or more mould cavities 10 in a product release position thereof, here near the bottom part of the circular trajectory above the conveyor 35, so as to facilitate and/or cause ejection of the moulded food product 40 from the one or more mould cavities 10 at this product release position.

The ejection system comprises a first air compressor 251, a first pressurized air storage tank 252, a first pressure regulating valve 253, and a first air control valve 254 at the outlet of the first tank 252.

In this example the ejection system also comprises a second air compressor 261, a second pressurized air storage tank 262, a second pressure regulating valve 263, and a second air control valve 264 at the outlet of the second tank 262.

Generally, as with the earlier described source 50, the air ejection system is operable to feed pressurized air at a regulated ejection air pressure thereof to an ejection air emitter 55 that is arranged on the frame near, e.g. close to the axial end of, the drum 5. In operation the inlets of the ducts 8 of the drum sequentially pass the air emitter 55 and align therewith to allow the introduction of ejection air into the duct 8. This air then flows out of permeable surface of the one or more cavities 10 connected to said duct 8 and, as is known in the field, facilitates and/or causes ejection of the moulded food product from said one or more cavities at the product release position as is depicted in FIG. 4.

It is envisaged that the assembly 250 allows to regulate the pressure of ejection air so as to provide air to each air duct 8 at a variable pressure level during a single air ejection event, for instance first at a lower air pressure and then at a higher air pressure.

For example pressurized air is stored in the first air storage tank 252 at a relatively high pressure and in the second storage tank 262 at a relatively low pressure. By suitable control of the valves 254 and 264 the effect can be achieved that—during a single ejection event—air from the first air storage tank 252 is released into the duct 8 during one part of the duration of the ejection event and air from the second storage tank 264 during the other part of the duration of the ejection event. As the ducts 8 may pass the emitter 55 in practical embodiments at a rate of over 100 ducts per minute, e.g. between 200 and 250 ducts per minute, this may involve control of timing of the valves 254, 264 in the milliseconds domain which is possible using e.g. direct operated solenoid valves. The valves 254, 264 may be arranged close to the emitter 55.

In a practical operation of the illustrated installation first the valve 264 of the second storage tank 262 is opened so that air at relatively (compared to the higher pressure in the first storage tank 252) low second pressure is fed into the duct 8, e.g. causing an initial release of the moulded product from the cavity 10. Then with a very small lag time, a burst of higher pressure air from the first storage tank 252 is released by valve 154 and is used to cause the released product 40 to be effectively emitted from the cavity 10. In embodiments one can also envisage the initial application of the first air pressure and then the lower second air pressure.

FIG. 6a illustrates a mould drum 120 having rows of mould cavities 121, 122, 123 generally parallel to the drum axis. For each row of cavities a dedicated air duct 124, 125, 126 is provided in the drum. These ducts 124, 125, 126 here each have inlets or openings at both axial ends of the drum, e.g. in the stern face of the drum 120 as depicted here.

Figure 6B:
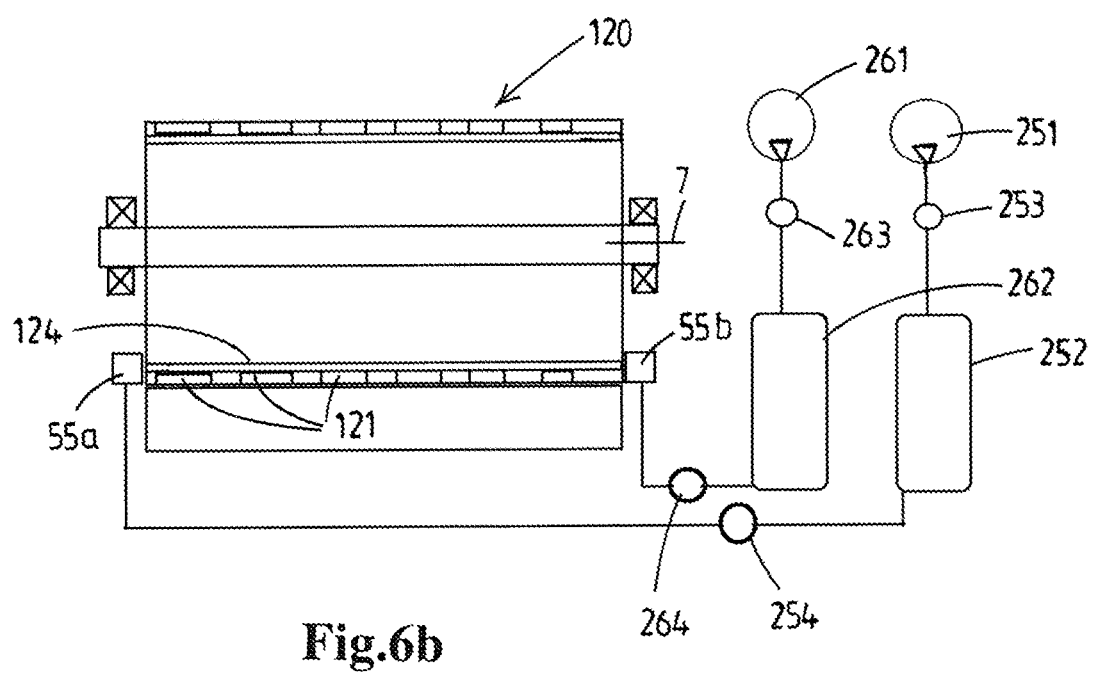

FIG. 6b. illustrates the provision of two ejection air emitters 55a, b at the opposed axial ends of the path of the drum 120, the one air emitter 55a being connected via valve 254 to the first storage tank 252 and the second ejection air emitter 55b being connected via valve 264 to the second storage tank 262. It will be appreciated that this arrangement allows to obtain a two level air pressure burst to eject products 40 from the mould cavities.

The use of variable pressure level, e.g. two distinct pressure levels, of the ejection air during a single air ejection event may serve to optimize the release and ejection of moulded food products as well as serve to optimize the use of pressurized air for this purpose. It will be appreciated that, if desired, more complex arrangements are possible to obtain a variation of air pressure over the duration of a single air ejection event, e.g. using rapidly responding air pressure control valve.

The invention claimed is:

1. A moulding installation for moulding food products from a pumpable foodstuff mass, which installation which comprises:
   a frame;
   a mould drum having an outer circumferential drum surface and a longitudinal drum rotation axis, the mould drum being rotatably supported by the frame to revolve about the drum rotation axis, wherein said outer circumferential drum surface comprises multiple mould cavities, each mould cavity having a fill opening for introduction of foodstuff mass into the mould cavity;
   a mould drum drive coupled to the mould drum to drive the mould drum in a rotation direction;
   a mass feed member arranged at a fill position relative to the outer circumferential drum surface, said mass feed member having a chamber with an inlet for foodstuff mass to introduce said foodstuff mass into the chamber and with a mouth facing the drum surface, said mass feed member being configured to transfer foodstuff mass into passing mould cavities of the revolving mould drum when the fill opening of a mould cavity is in communication with the mouth at said fill position, said foodstuff mass forming a food product in said mould cavity;
   a foodstuff mass feed and pressurization system configured to feed foodstuff mass into the chamber of the mass feed member and via said mouth into said mould cavities;
   a pressurized air food product ejection system, wherein the mould drum has air ducts that extend to said cavities and wherein at least a portion of the surface delimiting a mould cavity is air permeable, wherein each of said air ducts is configured to transport pressurized air to one or more of said mould cavities so that said air passes through said air permeable mould cavity surface portion, and wherein said pressurized air food product ejection system further comprises a pressurized air source including a first pressurized air storage tank and a first air pressure regulating valve configured to regulate air pressure in the first pressurized air storage tank, which pressurized air source is operable to feed pressurized air at a regulated ejection air pressure thereof to one or more of said air ducts associated with one or more mould cavities in a product release position thereof so as to facilitate and/or cause ejection of the moulded food product from said one or more mould cavities at said product release position; and a controller which is linked to said first air pressure regulating valve of said foodstuff mass feed and pressurization system and is configured to input at least one target parameter related to the filling of the mould cavities with said foodstuff mass via said mouth of the mass feed member, said at least one target parameter being one or more of:

a target fill pressure for the foodstuff mass in the chamber of the mass feed member and/or in the mould cavity to be caused by said foodstuff mass feed and pressurization system; and/or a target volumetric flow rate for the foodstuff mass into the chamber of the mass feed member and/or into the mould cavity to be caused by said foodstuff mass feed and pressurization system; and/or a target rotational speed of the mould drum, and wherein the controller is configured to automatically control said first air pressure regulating valve and set said ejection air pressure by said pressurized air source on the basis of the inputted target parameter.

2. The moulding installation according to claim 1, wherein the controller comprises a memory wherein a list of selectable foodstuff masses is stored, and wherein the controller is configured to input a selection of a foodstuff mass from said list of selectable foodstuff masses, and wherein the controller has a memory wherein predetermined combinations are stored of on the one hand at least each selectable foodstuff mass and said target parameter and on the other hand said automatically set ejection air pressure.

3. The moulding installation according to claim 1, wherein the controller comprises a memory wherein a list of selectable mould drums is stored with, and wherein the controller is configured to input a selection of a mould drum from said list of selectable mould drums, and wherein the controller has a memory wherein predetermined combinations are stored of on the one hand at least each selectable mould drum and said target parameter and on the other hand said automatically set ejection air pressure.

4. The moulding installation according to claim 1, wherein at least one mould drum is provided with at least a first air duct and second air duct, each extending to a corresponding first and second group of mould cavities of said mould drum respectively, and wherein said mould cavities of said first group differ from said second group, and wherein said controller is configured to automatically set a first group ejection air pressure for ejection of food products from said first group and a different second group ejection air pressure for ejection of food products from said second group by said pressurized air source on the basis of the inputted target parameter.

5. The moulding installation according to claim 1, wherein the controller comprises a memory wherein a list of selectable foodstuff masses and list of selectable mould drums is stored, and wherein the controller is configured to input a selection of a foodstuff mass from said list of selectable foodstuff masses and to input a selection of a mould drum from said list of selectable mould drums, and wherein the controller has a memory wherein predetermined combinations are stored of on the one hand at least each selectable foodstuff mass, each selectable mould drum, and said target parameter and on the other hand said automatically set ejection air pressure.

6. The moulding installation according to claim 1, wherein the controller comprises an operator ejection air pressure override allowing an operator to override an automatically set ejection air pressure.

7. The moulding installation according to claim 1, wherein said target parameter comprises or consists of said target fill pressure for the foodstuff mass in the chamber of the mass feed member and/or in the mould cavity to be caused by said foodstuff mass feed and pressurization system, and wherein said automatically set ejection air pressure lies within 0.8 and 2 times the target fill pressure.

8. The moulding installation according to claim 1, wherein said selectable target fill pressure lies between 6 and 15 bar, and wherein said pressurized air source is adapted and operable to feed pressurized air at a controllable ejection air pressure at least in the range extending from 4 to 18 bar.

9. The moulding installation according to claim 1, wherein the pressurized air source further comprises an air compressor and a second air pressure regulating valve connected to a second pressurized air storage tank, each of the first and second pressurized air storage tanks having an inlet connected to said air compressor by means of a respective air pressure regulator among the first air pressure regulating valve and the second air pressure regulating valve, and an outlet provided with an air release valve configured to cause release of a burst of air from the respective one of the first and second pressurized air storage tanks into an air duct in the mould drum associated with cavities at said food product release position.

10. The moulding installation according to claim 1, wherein the air permeable portion of the surface delimiting a mould cavity is of porous material.

11. The moulding installation according to claim 1, wherein the controller is a computerized controller which is programmed to automatically set said ejection air pressure.

12. A method for moulding food products from a pumpable foodstuff mass, wherein use is made of the installation according to claim 1, wherein the method comprises:

revolving the mould drum about said drum rotation axis by means of said mould drum drive;

feeding foodstuff mass into the chamber of the mass feed member and transferring said foodstuff mass via said mouth into said mould cavities of said mould drum, said foodstuff mass forming a food product in said mould cavity;

feeding pressurized air at a regulated ejection air pressure thereof to one or more of said air ducts associated with one or more mould cavities in a product release position thereof so as to facilitate and/or cause ejection of the moulded food product from said one or more mould cavities at said product release position; and inputting at least one target parameter into said controller, said target parameter relating to filling of the mould cavities with said foodstuff mass via said mouth of the mass feed member, said at least one target parameter being:

a target fill pressure for the foodstuff mass in the chamber of the mass feed member and/or in the mould cavity to be caused by said foodstuff mass feed and pressurization system; and/or a target volumetric flow rate for the foodstuff mass into the chamber of the mass feed member and/or into the mould cavity to be caused by said foodstuff mass feed and pressurization system; and/or a target rotational speed of the mould drum, wherein the controller automatically sets an ejection air pressure by said pressurized air source on the basis of the inputted target parameter.

13. The method according to claim 12, wherein the step of revolving the mould drum takes place at non-continuous speed.

* * * * *